United States Patent Office 3,045,512
Patented July 24, 1962

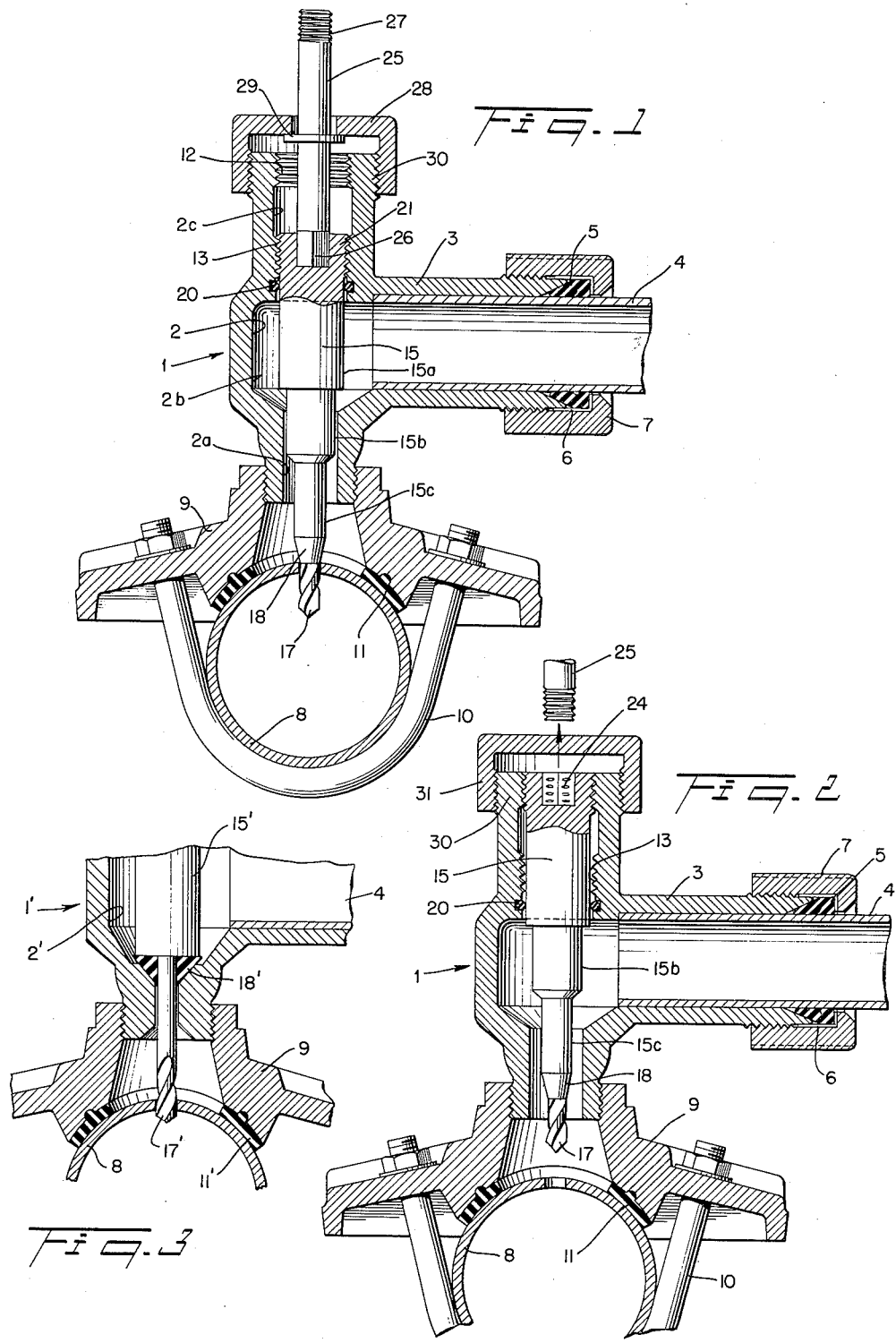

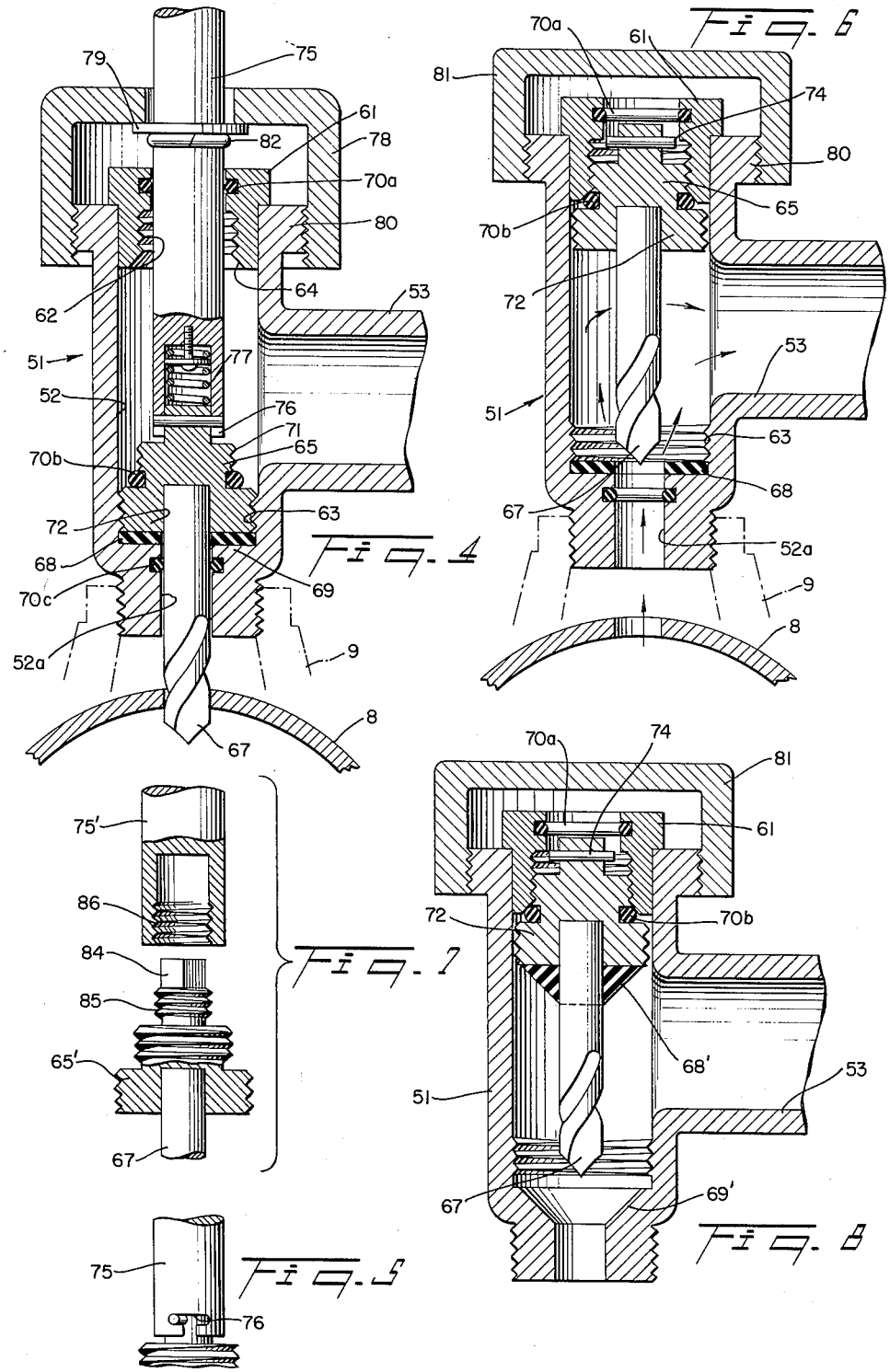

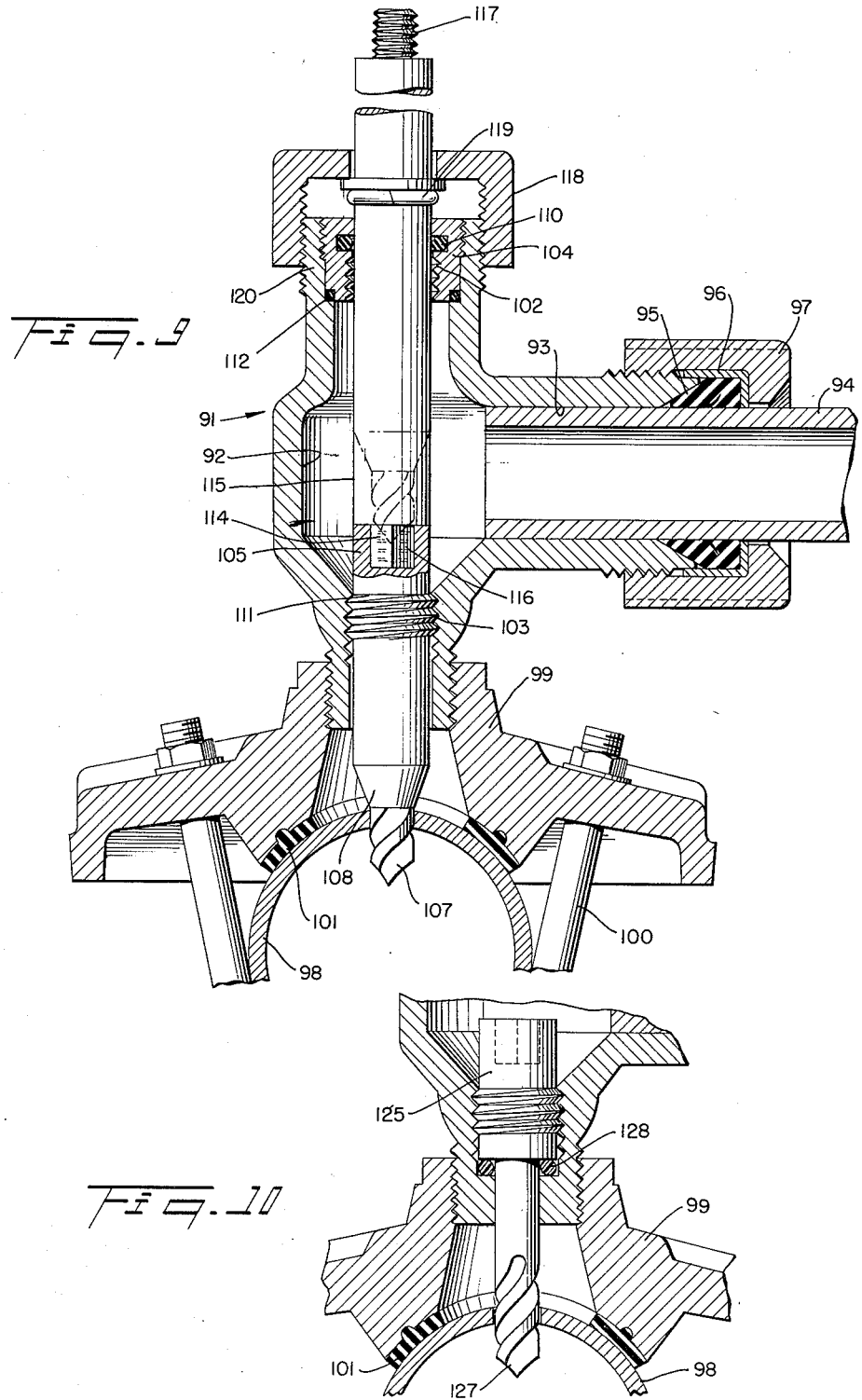

3,045,512
SERVICE FITTING
Roger E. Risley and John P. Mann, Bradford, Pa., assignors to Dresser Industries, Inc., Dallas, Tex., a corporation of Delaware
Filed July 31, 1959, Ser. No. 830,865
10 Claims. (Cl. 77—38)

The present invention relates to pipe fittings for connecting a service line to an existing main. The terms "service line" and "main" are both used in a generic sense to indicate one pipeline branching off another. While fittings in accordance with the invention are widely applicable, they are particularly useful in connection with gas distribution systems.

For example when a new residence or other building is erected on a street having an existing gas main, it is necessary to provide a service line for the new building and to connect the service line with the main. Moreover, it is desirable to make the connection without interrupting service to other buildings already served by the main. This is done by clamping or welding a T to the main with its axial bore perpendicular to the main connecting the lateral bore of the T to the new service line, inserting a drill in the axial bore to drill a hole through the wall of the main, withdrawing the drill and plugging or capping the upper end of the T. However, with this operation, it is difficult to avoid the escape of a considerable amount of gas which is injurious to workmen and creates the danger of a serious explosion. Various valve arrangements and other devices have been proposed to avoid or reduce gas leakage but such expedients are expensive and have not been found wholly satisfactory.

The present invention represents a different approach to the problem in that a drill is incorporated in the fitting as a permanent part and is not removed. After the fitting has been connected to the main and a service line has been connected to the fitting, the drill is operated to drill a hole through the wall of the main so as to provide for the flow of fluid from the main to the service line. Valve means associated with the drill is operable to block the flow of gas to the new service line until everything is ready for putting the line into service. The drill is then retracted from the hole which has been drilled in the main so that it does not obstruct the flow of fluid to a service line. As the drill is left permanently in the fitting, the difficulty of preventing gas leakage during removal of the drill is avoided. The drill does not materially increase the cost of the fitting since it is intended for a single use and can hence be of inexpensive construction. In fact, the drill is less expensive than various valve arrangements heretofore proposed. Moreover, the fittings in accordance with the invention make possible important savings of labor in installation and improved safety conditions.

The characteristics, objects and advantages of the invention will be more fully understood from the following description and claims and from the accompanying drawings which show a preferred embodiment of the invention and in which FIG. 1 is a longitudinal section of a fitting in accordance with the invention shown in connection with a main and a service line, the parts being shown in a position just after a hole has been drilled through the wall of the main.

FIG. 2 is a longitudinal section corresponding to FIG. 1 but showing the drill in retracted position.

FIG. 3 is a fragmentary section corresponding to a portion of FIG. 1 but showing a modification.

FIG. 4 is a longitudinal section of another embodiment of the invention.

FIG. 5 is a fragmentary view taken approximately on the line 5—5 in FIG. 4.

FIG. 6 is a longitudinal section corresponding to FIG. 4 but showing the drill retracted.

FIG. 7 is a fragmentary view corresponding to a portion of FIG. 4 but showing another form of drill stem including an extension portion which is shown in disconnected position.

FIG. 8 is a longitudinal section corresponding to FIG. 6 but showing a modification.

FIG. 9 is a longitudinal section of another embodiment of the invention.

FIG. 10 is a fragmentary longitudinal section showing a modification.

The embodiment of the invention shown by way of example in FIGS. 1 and 2 comprises a T-shaped body portion or casing 1 having an axial bore 2 and a passageway 3 opening laterally off of the axial bore. A branch or service line 4 is connected to the lateral passageway 3 for example by means of a gasket 5, retainer cup 6 and follower nut 7 providing a fluidtight connection. Means is also provided for connecting the lower end of the casing 1 to the wall of a main 8 with a fluidtight connection. While the casing may, if desired, be welded or otherwise secured to the main, it is shown as being screwed into a saddle 9 which is clamped onto the main for example by U-bolts 10 with an annular gasket 11 interposed between the saddle and the main.

The axial bore 2 of the casing 1 is on a line which intersects and is preferably perpendicular to the main 8 and comprises a lower cylindrical portion 2a, an enlarged intermediate portion 2b into which the lateral passageway 3 opens and an upper portion 2c in which there are provided spaced internal threads 12 and 13 separated by a cylindrical portion having an internal diameter slightly greater than the root diameter of the threaded portion. A stem 15 is rotatable and axially movable in the bore 2 of the casing 1. The stem has an upper cylindrical portion 15a which fits into the upper portion of the bore 2, an intermediate cylindrical portion 15b which fits freely into the cylindrical portion 2a of the bore and a lower cylindrical portion 15c of smaller diameter.

On the lower end of the stem 15 there is provided a rotary drill bit 17 which is integral with the stem or otherwise permanently fixed on it. The drill bit 17 is relatively short, having a length somewhat greater than the thickness of the wall of the main 8. It is provided with suitable cutting edges and is shown as comprising a metal twist drill. The cutting portions of the drill 17 are sufficiently hardened to cut the wall of the main. In a preferred construction, the drill 17 is locally hardened so as to have cutting edges that are harder than the body of the stem 15. As the drill is intended to be used only once, it can be made of high carbon steel or other relatively inexpensive material. A lower end portion of the stem 15 just above the drill 17 is tapered so as to provide a conical valve portion 18.

A permanent fluidtight seal is provided between the upper portion of the casing and the stem 15. As illustrated by way of example in the drawings, the seal is provided by an O-ring 20 which is seated in an annular recess in the bore 2 just below the threaded portion 13 and engages the upper cylindrical portion 15a of the stem. An upper end portion 21 of the stem is externally threaded and adapted to screw into the threaded portion 13 of the bore 2 when the stem is in a lower position as shown in FIG. 1 and to screw into the threaded portion 12 when the stem is in an upper position as illustrated in FIG. 2. The length of the threaded portion 21 of the stem 15 in an axial direction is less than the space between the threaded portions 12 and 13, and the distance between the threaded portion 21 and the drill 17 is such that when the tip of the drill 17 engages the wall of the main 8 at the start of the drilling operation, the threaded portion 21 is just below the threaded portion 12 of the bore. The threaded portion 21 of the stem does not engage the threads 13 of the bore until after a hole has been drilled completely through the wall of the main. Hence during the drilling operation the threaded portion 21 of the stem is disposed in the space between the threaded portions 12 and 13 of the bore and does not engage either of these threaded portions.

At its upper end, the stem 15 is provided with a socket 24 to receive a stem extension 25. One end 26 of the stem is of non-circular, for example square, cross section while the opposite end 27 is threaded. The outside diameter of the threaded portion 27 measured to the crest of the threads corresponds approximately to the maximum transverse dimension of the non-circular end 26, for example the diagonal of a square end. The socket 24 in the stem 15 is adapted to receive both ends of the stem extension 25 interchangeably. For example if the end 26 of the stem is square, the socket 24 is likewise square with threads cut into the flat sides of the socket so as to receive the threaded end 27 of the stem extension. The threads in the socket 24 are preferably opposite in direction to the threads 12 and 13 in the bore 2. For example if the threaded portions 12 and 13 have right hand threads, the socket 24 and threaded portion 27 of the stem extension have left hand threads. As seen in FIG. 1, the stem extension 25 projects upwardly beyond the upper end of the casing 1. An internally threaded feed collar 28 engages a shoulder or collar 29 provided on the stem extension 25 intermediate its ends and screws onto an externally threaded upper end portion 30 of the casing 1 so as to force the stem 15 downwardly during the drilling operation to feed the drill into drilling engagement with the wall of the main 8.

In using the fitting shown by way of example in FIGS. 1 and 2 to connect a new service line to an existing main, the fitting is secured to the main in proper position by means of the U-bolts 10. The gasket 11 provides a fluidtight seal between the wall of the main 8 and the saddle 9 into which the body portion 1 of the fitting is screwed. A service line 4 is stabbed into the passageway 3 and the follower nut 7 is tightened to provide a fluidtight connection. The end of the drill bit 17 is brought into engagement with the wall of the main and the drill is rotated by hand or by power by means of the stem 15 and extension 25, the square end of which fits into the square socket 24 in the upper end of the stem 15 to provide a driving connection. A suitable handle or suitable power means—for example an electric drill—is clamped onto the projecting upper end portion of the stem extension 25 to rotate the stem and drill. As the drill is rotated, the collar 28 is screwed down onto the threaded upper end 30 of the casing 1 so as to feed the drill progressively downwardly so as to cause it to drill through the wall of the main. During the drilling operation, the threaded portion of the stem 15 is disposed between the threads 12 and 13 of the casing so that the threads are not interengaged. When a hole has been drilled completely through the wall of the main, the threaded portion 21 of the stem engages threads 13 in the casing and the stem is rotated in a clockwise direction so as to screw the stem downwardly and thereby bring the conical portion 18 at the lower end of the stem into fluidtight engagement with the edge of the hole drilled through the wall of the main. The conical portion 18 thereby acts as a valve member to close off the hole and thereby prevent flow of gas or other fluid from the main into the fitting.

When it is desired to put the new branch line into service, the feed collar 28 is unscrewed and the stem extension 25 is reversed, the left hand threaded end 27 being screwed into the socket 24. By continued rotation of the stem extension 25 in a counterclockwise direction, the threaded portion 21 of the stem is unscrewed from the threads 13. When the threads have become disengaged, the stem is lifted by means of the extension 25 and rotation in a counterclockwise direction is continued so as to cause the threaded portion 21 of the stem to be screwed upwardly into the threads 12. The stem is thereby secured in a retracted or raised position as shown in FIG. 2. It will be seen that with the stem in retracted position, the conical valve portion 18 is withdrawn from the hole in the wall of the main 8 and the intermediate portion 15b of the stem is withdrawn from the lower portion 2a of the casing so as to permit free flow of gas or other fluid from the main 8 through the hole in the wall of the main, the lower and intermediate portion of the bore 2 in the casing and the passageway 3 into the service line 4. The O-ring 20 provides a permanent fluidtight seal between the upper portion of the casing and the stem 15 so as to prevent the escape of gas. The stem 15 remains permanently in the casing 1. However, the extension 25 is preferably unscrewed from the socket 24 and removed. A cap 31 is then screwed onto the threaded upper end 20 of the casing so as to protect the upper end of the casing and stem.

If at any time it is desired to close off the service line from the main, for example to make repairs, the cap 31 is removed and the square end of the stem 25 or other suitable instrumentality is inserted in the socket 24 of the stem so as to screw the stem downwardly to the position shown in FIG. 1 in which the valve portion 18 closes off the hole in the main as described above. As an alternative method of using the fitting in accordance with the invention, the lateral passageway 3 may be closed with a suitable plug during the drilling of a hole through the main. After the hole has been closed by the conical valve portion 18, the plug is removed and a service line is connected up to the fitting. The valve is then opened as described above to put the branch line into service.

In FIG. 3 there is shown a modification in which the conical valve portion 18 is replaced by a valve member 18' comprising a conical washer of plastic or elastomer material surrounding a shank portion of the drill bit 17' and seated against a shoulder of the stem 15'. The bore 2' of the casing 1' is shaped to provide an annular seat for the valve member 18'. When the stem 15' is in its lowermost position as shown in FIG. 3, the valve member 18' closes off the bore of the casing leading from the main to the service line 4. The upper portions of the stem and casing are constructed as illustrated in FIGS. 1 and 2 so that interengaging threaded portions of the stem and casing hold the stem 15' either in a lower position with the valve closed as shown in FIG. 3 or in a raised position in which the drill is retracted into the enlarged intermediate portion of the bore 2' so as to permit flow of fluid from the main to the service line. The spacing of the threaded portions in the casing is sufficient to provide withdrawal of the stem upwardly to the extent desired.

In FIGS. 4, 5 and 6, there is illustrated another embodiment of the invention comprising a casing 51 having an axial bore 52 and a lateral passageway 53 provided with means for making a fluidtight connection to a branch or service line for example as illustrated in FIGS. 1 and 2. The casing 51 is suitably secured to a main 8 with a fluidtight connection for example by means of a saddle, U bolts and gasket as shown in FIG. 1. A bushing 61 secured in the upper end of bore 52 of the casing for example by a press fit is internally threaded as indicated at 62 and at its lower end is provided with a tapered gasket seat 64. A lower portion of the bore 52 just below the lateral passageway 53 is internally threaded as indicated at 63. The lower portion 52a of the bore is of smaller diameter so as to provide a shoulder 69 just below the threaded portion 63.

A drill stem 65 in the bore 52 carries at its lower end a twist drill bit 67 extending through the reduced portion 52a of the bore when the stem 65 is in its lower position as illustrated in FIG. 4. An annular valve member 68 formed for example of plastic or elastomer material surrounds the shank portion of the drill bit 67 and seats against an annular shoulder formed by the lower end of the stem 65. The valve member 68 is adapted to seat against the shoulder 69 of the casing to form a fluidtight closure. An upper portion of the stem 65 is externally threaded as indicated at 71 and is adapted to screw into the threads 62 of the casing bushing when the stem is in a raised position as illustrated in FIG. 6. A lower portion of the stem 65 is externally threaded as indicated at 72 so as to screw into the threads 63 of the casing when the stem is in a lower position as illustrated in FIG. 4.

A stem extension 75 extends down through the bushing 61 and is provided at its lower end with means for releasably connecting the extension to the stem 65 so as to rotate the latter and also move it axially in the casing. As illustrated in FIGS. 4, 5 and 6 the connecting means comprises a transverse pin 74 on an upper end portion of the stem 65 adapted to engage in diametrically opposite slots 76 provided in a tubular lower end portion of the extension. It will be seen that the slots 76 are L-shaped so that when they are engaged with the pin 74 the stem 65 can be lifted as well as rotated by means of the extension 75. A compression spring 77 in the hollow lower end portion of the extension 75 presses downwardly on the upper end of the stem 65 so as to tend to retain the ends of the pin 74 in the inner end portions of the slot 76 which are preferably depressed slightly to avoid accidental disengagement of the extension 75 from the stem 65.

When the stem is in its lower position as shown in FIG. 4, an O-ring 70a seated in an annular recess in the bushing 61 provides a fluidtight seal between the casing and the stem extension 75, while an O-ring 70c provides a fluidtight seal between a lower portion of the casing and the shank portion of the drill 67. When the stem is in its raised position as shown in FIG. 6, an O-ring or gasket 70b seats against the tapered surface 64 of the bushing 61 to provide a fluidtight seal between the stem 65 and the casing.

A feed collar 78 is adapted to engage a shoulder 79 on the stem extension 75 and screws down onto an externally threaded upper end portion 80 of the casing so as to exert a downward force on the drill bit during a drilling operation. The shoulder 79 may be provided by a washer held in place by one or more snap rings 82.

The fitting shown in FIGS. 4, 5 and 6 is used in essentially the same manner as described above with reference to FIGS. 1 and 2. After the casing 51 has been secured to the main 8, the stem 65 and drill bit 67 are rotated by means of the upwardly projecting extension 75 while the feed collar 78 is screwed progressively downwardly to drill a hole through the wall of the main. During the drilling operation, the threaded portions of the stem 65 are disposed in the space between the threads 62 and 63 of the casing. After a hole has been drilled through the wall of the main, the stem 65 is screwed down into the threads 63 so as to bring the valve member 68 into engagement with the shoulder 69 to provide a fluidtight seal. When it is desired to put the branch line into service, the stem 65 is unscrewed from the threads 63, raised axially and the threaded portion 71 is screwed into the threads 62 of the casing bushing 61 so as to hold the stem in raised position as shown in FIG. 6. The valve means is thereby opened to permit flow of fluid from the main 8 to a service line connected to the lateral passageway 53. The gasket 70b provides a fluidtight seal between the stem and casing so as to avoid the escape of fluid. The extension 75 is then disconnected by pressing it downwardly and turning it slightly to disengage the slot 76 from the ends of pin 74. A cap 81 is preferably screwed onto the threaded upper end 80 of the casing. If at any subsequent time it is desired to close off the service, the cap 81 is removed, the extension 75 is again connected to the stem 65 and the latter is returned to the position shown in FIG. 4.

In FIG. 7 there is illustrated a modification of the means for connecting a stem extension 75' to a stem 65'. The upper end of the stem 65' is provided with a short square portion 84 below which there is a threaded portion 85 with left hand threads. The diagonal distance across the square portion does not exceed the root diameter of the threaded portion 85. The stem extension 75' is provided at one end with internal left hand threads 86 adapted to engage threads 85 of the stem 65' while the opposite end is provided with the square socket (not shown) adapted to fit over the square portion 84 of the stem. The extension 75' is thus reversible end-for-end. The square socket end is engaged with the square portion 84 of the stem to rotate the stem and drill during the drilling operation while the threaded portion 86 of the extension 75' is engaged with the threads 65 on the stem to raise the stem and drill from a lower position as shown in FIG. 4 to an upper position as shown in FIG. 6.

In FIG. 8 there is shown a further modification in which the flat annular gasket 68 shown in FIGS. 4 and 6 is replaced by a conical gasket 68' and the shoulder 69' of the casing 51 is correspondingly shaped to provide a seat for the valve member 68'.

In FIG. 9 there is illustrated another embodiment of the invention comprising a casing 91 having an axial bore 92 and a lateral passageway 93. A branch line 94 is connected to the lateral passageway 93, for example by means of a gasket 95, retainer cup 96 and follower nut 97 providing a fluidtight connection. The lower end of casing 91 is screwed into a saddle 99 secured to a main 98 by U-bolts 100 with an annular gasket 101 providing a fluidtight seal.

A bushing 104 screwed into the upper end of the axial bore 92 is internally threaded as indicated at 102 while a lower portion of the bore 92 is threaded as indicated at 103. The threads 102 and 103 are of the same pitch and diameter. A stem 105 is provided at its lower end with a drill bit 107 and a conical valve portion 108 just above the drill bit. A portion of the stem 105 spaced a selected distance from the upper end is provided with external threads 111 adapted selectively to engage threads 102 and 103 of the casing. The upper end of the stem 15 is provided with a socket 114 to receive a stem extension 115 which is shown as having one square end 116 and an opposite threaded end 117 provided with left handed threads. The socket 114 of the stem is adapted to receive either end of the stem extension interchangeably. An O-ring 110 seated in a recess in the bushing 104 provides a fluidtight seal with the stem extension when in the position shown in solid lines in FIG. 9 and also provides a fluidtight seal with the cylindrical upper portion of the stem 105 when the stem is raised to an upper position as indicated in broken lines. An O-ring or other gasket 112 assures a fluidtight seal between the bushing 104 and the body of the casing 91. An internally threaded collar 118 engages a snap ring or other shoulder 119 on the stem extension 115 and screws onto a threaded upper end 120 of the casing 91 to force the stem and drill bit downwardly during the drilling operation.

The operation of the embodiment shown in FIG. 9 is essentially the same as that of FIG. 4. It will be noted that the O-ring 110 provides a fluidtight seal both in the lower and in the upper position of the stem so that only a single seal is required. When the stem is in its upper position as indicated in broken lines and the stem extension 115 is removed, a cap (not shown) corresponding to the cap 81 of FIG. 6 is preferably screwed onto the threaded upper end 120 of the casing 91.

In FIG. 10 there is shown a modification of the construction illustrated in FIG. 9. The stem 125 is provided at its lower end with a drill bit 127. Instead of the tapered valve portion 108 shown in FIG. 9, there is provided an O-ring or other gasket 128 formed, for example, of nylon which is engaged between a shoulder on the stem 125 and a cooperating shoulder in the lower end of the casing to provide a fluidtight closure when the stem 125 is in its lowermost position as shown.

It will be understood that the individual features of the several embodiments and modifications herein shown and described are mutually interchangeable and that other modifications may be made without departing from the scope and spirit of the invention.

What we claim and desire to secure by Letters Patent is:

1. A fitting for connecting a service line to an existing main, comprising a hollow casing defining a bore, means for securing said casing to a main with said bore intersecting said main and with a fluidtight seal between said main and said casing, a branch opening laterally off of said bore intermediate its ends, means for connecting a service line to said branch with a fluidtight connection, a stem rotatable and axially movable in said bore, a drill bit on the inner end of said stem and engageable with said main, means for rotating said stem and bit to drill a hole through the wall of said main, means providing a fluidtight seal between said stem and bore outwardly of said branch, valve means on said stem, said stem being movable axially between an inner position in which said valve means closes off said bore inwardly of said branch and an outer position in which said bore inwardly of said branch is open to permit flow of fluid from said main through said hole, an inner portion of said bore and said branch to said service line, threaded means on said stem, first interengaging threaded means on said casing to engage with said threaded means on said stem to hold said stem in said inner position and second interengaging threaded means on said casing to engage with said threaded means on said stem to hold said stem in said outer position, said stem remaining permanently in said casing and closing an outer end portion of said bore, said first interengaging threaded means and said second interengaging threaded means being axially spaced apart to leave an unthreaded intermediate portion in said casing adapted to receive said threaded means on said stem whereby said stem is rotatable in said casing without threaded engagement with said casing when said threaded means on said stem are disposed in said intermediate portion.

2. A fitting according to claim 1, in which said stem has a smooth cylindrical portion disposed in an outer portion of said bore and in which said seal-providing means comprising an O-ring seated in an annular recess in said bore and engaging said cylindrical portion of the stem.

3. A fitting according to claim 1, in which said valve means comprises a conical portion on said stem just outwardly of said drill bit and adapted to engage the periphery of said drilled hole in the main when said stem is in said inner position.

4. A fitting according to claim 1, in which said bore is stepped with a larger intermediate portion and smaller end portions, with shoulders formed between said intermediate portion and said end portions.

5. A fitting according to claim 4, in which said valve means comprises a valve portion on said stem engageable with said shoulder of said bore between said intermediate portion and the inner end portion when said stem is in said inner position.

6. A fitting according to claim 1, in which said stem comprises an inner portion and an outer portion, said outer portion projecting outwardly of said casing and being severable from said inner portion.

7. A fitting according to claim 6, further comprising a cap covering the outer end of said bore when said outer stem portion has been removed.

8. A fitting for connecting a service line to a main, comprising a hollow casing defining a bore, means for securing said casing to a main with said bore intersecting said main and with a fluidtight seal between said main and said casing, a branch passageway opening laterally off of said bore intermediate its ends, means for connecting a service line to said branch passageway with a fluidtight connection, a stem rotatable and axially movable in said bore, a drill bit on the inner end of said stem and engageable with said main, means for rotating said stem and bit to drill a hole through the wall of said main, means providing a fluidtight seal between said stem and bore outwardly of said branch, valve means on said stem, said stem being movable axially between an outer position in which said valve means is open to permit flow of fluid from said main through said hole, an inner portion of said bore and said branch to said service line and an inner position in which said valve is closed, axially spaced internally threaded portions in said bore and an externally threaded portion on said stem engageable with one of said bore threaded portions to hold said stem in valve closing position and engageable with the other of said bore threaded portions to hold said stem in valve opening position, the axial length of the space between said bore threaded portions being greater than the axial length of said stem threaded portion, said stem remaining permanently in said casing and closing an outer end portion of said bore.

9. A fitting according to claim 8, in which said bore threaded portions are on opposite sides of said branch, one being inwardly of said branch and the other outwardly.

10. A fitting for connecting a branch line to a main, comprising a casing defining a bore having a larger intermediate portion and reduced inner and outer end portions, means for securing said casing to a main with said bore intersecting said main and with a fluidtight seal between the inner end of said bore and said main, a branch passageway opening laterally off of said intermediate portion of the bore, means for connecting a branch line to said branch passageway with a fluidtight connection, a stem rotatable and axially movable in said bore, said stem comprising an inner portion in said bore and an outer portion extending outwardly of said bore, means providing a fluidtight seal between the outer end portion of said bore and said stem, a drill bit on the inner end of said stem in position to engage said main, said stem being rotatable by means of said extending portion to rotate said drill bit to drill a hole in said main, valve means on said inner stem portion, said stem being movable axially between an outer position in which said valve means is open to permit fluid to flow from said main through said hole, bore and branch passageway to said branch line, and an inner position in which said valve is closed to stop said flow, inter-engaging means on said inner stem portion and casing for holding said stem selectively in said inner position and said outer position, and means releasably connecting said inner and outer stem portions, said releasable connecting means transmitting torque and axial movement from said outer stem portion to said inner stem portion, said casing being formed with a portion free from inter-engagement with said inner stem portion intermediate said inner position and said outer position whereby said inner stem portion is rotatable within said casing without threaded engagement therewith at at least one portion of its travel between said inner position and said outer position.

References Cited in the file of this patent

UNITED STATES PATENTS

| | | |
|---|---|---|
| 154,862 | Hand et al. | Sept. 8, 1874 |
| 1,065,248 | Hinman | June 17, 1913 |
| 2,839,075 | Mueller | June 17, 1958 |